Lane & Manning,
Reed Organ,

N°. 18,751. Patented Dec. 1, 1857.

UNITED STATES PATENT OFFICE.

GEO. W. LANE AND WM. N. MANNING, OF ROCKPORT, MASSACHUSETTS.

PEDAL-CASE FOR MELODEONS, &c.

Specification of Letters Patent No. 18,751, dated December 1, 1857.

*To all whom it may concern:*

Be it known that we, G. W. LANE and WILLIAM N. MANNING, both of Rockport, in the county of Essex and State of Massachusetts, have invented a new and useful Improvement in Pedal-Bases for Melodeons, Æolian Pianos, and other Reed Musical Instruments; and we do hereby declare that the following is a full, clear, and exact description of the same, reference being had to the accompanying drawings, making a part of this specification, in which—

Figure 1:
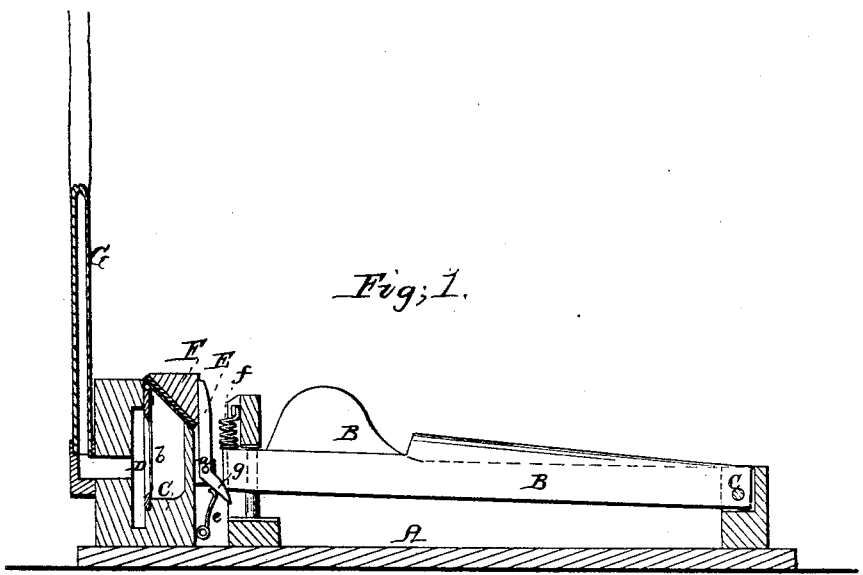
Figure 2:
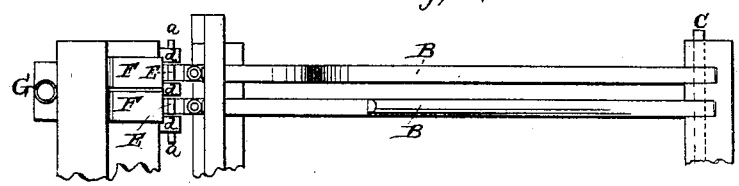

Figure 1 is a vertical section of a pedal base, constructed and arranged according to our invention. Fig. 2 is a plan of part of the same, including two of the pedals.

Similar letters of reference indicate corresponding parts in both figures.

Our invention consists in arranging the valves, the reeds, and the air-chamber of the pedal base of a melodeon or other reed instrument immediately behind the pedals, upon the pedal board or near the floor, instead of in the case of the instrument where they are usually placed, thereby dispensing with the long connecting rods and other comparatively complicated mechanism required with the usual arrangement to connect the pedals with the valves, and only requiring in place thereof a simple pipe to connect the air-chamber of the pedal reeds with the bellows of the instrument. This improvement makes a pedal base which is complete in itself and portable, and which can be applied in a few minutes to any melodeon, as all that is necessary to effect its attachment is a pipe to connect its air chamber with the bellows of the instrument.

Our invention also consists in a certain arrangement of parts for combining the pedals with the valves for the purpose of operating the latter.

To enable those skilled in the art to make and use our invention, we will proceed to describe its construction and operation.

A, is the pedal board which lays upon the floor and supports the whole of the pedal base.

B, B, are the pedals, arranged in the usual manner upon the board A, and working on a fulcrum pin c, at their front ends. The pedal board is extended some distance in rear of the pedals to form a support or foundation for the reed-board C, and the chamber D. The reed-board and the reeds b, occupy upright positions; the reed-board being only so far behind the keys as to leave room for the valve stems E, E, between it and the rear ends of the pedals. The air chamber is behind the reeds. The valves F, F, are fitted to inclined seats on the top of the reed board and their stems E, E, to whose upper parts the valves are attached, are in the form of bent levers, of the first order, working on fulcrum pins a, a, in blocks d, d, that are secured to the front of the reed board, the lower arms of said levers being so formed as to constitute inclined planes (see g, Fig. 1) for the ends of the pedals to work upon for the purpose of opening the valves; the said valves being opened by the pedals forcing back the inclined-plane-like portions of the levers when they are depressed. The action of the pedals upon the valves is illustrated in Fig. 1, where the valve is shown both closed and open, the former condition being represented in black outline and the latter in red. The ends of the pedals which act upon the valves may have rollers fitted to them to run down the inclined planes of the valve stems; but this will perhaps be unnecessary.

e, e, are springs applied between the reed board and the lower arms of the valve stems to close the valves when the pedals rise.

f, f, are springs applied to the rear ends of the pedals to raise them up when they are relieved from the pressure of the foot.

G, is a pipe for connecting the air-chamber D, with the bellows of the instrument. This pipe may be of india-rubber as that material, being flexible, obviates the necessity of its being exactly of a length to reach from the chamber to the bellows and thus affords greater facility for the attachment of the pedal base to an instrument already constructed.

The reed-board and valves are intended to be inclosed within a box or case, fitted with a swell or damper, as will be well understood by instrument-makers.

What we claim as our invention, and desire to secure by Letters-Patent, is:—

1. The arrangement of the valves, the reeds, and the air-chamber of the pedal base upon the pedal board, or otherwise in an equivalent manner arranging the same behind the pedals so that the whole of the pedal base is rendered portable and can be attached to any instrument by simply connecting its air-chamber by a pipe with the bellows of the instrument, substantially as herein described.

2. The arrangement of the valves, with their lever-like stems, inclined planes, and springs, substantially as described, for the purpose of combining the valves with the pedals to be operated thereby.

GEO. W. LANE.
WM. N. MANNING.

Witnesses:
I. W. LEIGHTON,
C. W. TARR.